US009933096B2

(12) United States Patent
Butkus et al.

(10) Patent No.: US 9,933,096 B2
(45) Date of Patent: Apr. 3, 2018

(54) LOCKING-RING CLOSURE HAVING AT LEAST ONE SCREW LOCK

(71) Applicant: BASF Coatings GmbH, Münster (DE)

(72) Inventors: Michael Butkus, Drensteinfurt (DE); Daniel Kruse, Münster (DE); Ralf Berg, Münster (DE)

(73) Assignee: BASF Coatings GmbH, Münster (DE)

( * ) Notice: Subject to any disclaimer, the term of this patent is extended or adjusted under 35 U.S.C. 154(b) by 50 days.

(21) Appl. No.: 14/407,778

(22) PCT Filed: Jun. 14, 2013

(86) PCT No.: PCT/EP2013/062417
§ 371 (c)(1),
(2) Date: Dec. 12, 2014

(87) PCT Pub. No.: WO2013/186380
PCT Pub. Date: Dec. 19, 2013

(65) Prior Publication Data
US 2015/0152988 A1 Jun. 4, 2015

Related U.S. Application Data

(60) Provisional application No. 61/659,502, filed on Jun. 14, 2012.

(30) Foreign Application Priority Data

Jun. 14, 2012 (EP) .................................. 12172060

(51) Int. Cl.
*F16L 33/06* (2006.01)
*B65D 45/32* (2006.01)

(52) U.S. Cl.
CPC .............. *F16L 33/06* (2013.01); *B65D 45/32* (2013.01); *Y10T 24/1441* (2015.01)

(58) Field of Classification Search
CPC ........ B65D 45/30; B65D 45/00; B65D 45/32; Y10T 292/214; Y10T 24/1441; F16B 2/065; F16B 7/025; F16L 33/06
(Continued)

(56) References Cited

U.S. PATENT DOCUMENTS 555,524 A * 3/1896 Oliver ............................. 217/95
632,030 A * 8/1899 Stevens .......................... 217/95
(Continued)

FOREIGN PATENT DOCUMENTS

| DE | 19728655 | 2/1999 |
| EP | 1559920 | 8/2005 |
| GB | 340869 | 1/1931 |

OTHER PUBLICATIONS

PCT International Search Report in PCT/EP2013/062417, dated Aug. 10, 2013, 2 pages.

*Primary Examiner* — Robert Sandy
*Assistant Examiner* — Rowland Do
(74) *Attorney, Agent, or Firm* — Armstrong Teasdale LLP

(57) ABSTRACT

A locking-ring closure for fastening lids on containers has: at least one screw lock and further has an open locking ring (1) having a U- or V-shaped cross section, bearing blocks (3) and (4) arranged at the ends of the locking ring, one of which bearing blocks has a through-passage hole and the other an internal thread, a screw (2) which extends through the through-passage hole in the one bearing block (3) and engages by way of its thread in the internal thread of the other bearing block (4), wherein the screw extends beyond the width of this bearing block and, on the portion that emerges from the bearing block, carries a fixed threaded ring (5) enclosing said portion. The screw (2) has, at its end opposite the screw head (6), a portion (8) adjacent to the threaded ring and arranged on that side of the threaded ring (5) that faces the screw head, which portion (8) has no thread (Continued)

engaging in the internal thread of the bearing block (4) and extends at least over the width of the bearing block.

5 Claims, 1 Drawing Sheet

(58) Field of Classification Search
USPC .......... 24/284, 279; 285/363–367, 406, 411
See application file for complete search history.

(56) References Cited

U.S. PATENT DOCUMENTS

| | | | | |
|---|---|---|---|---|
| 637,239 | A * | 11/1899 | Davis | 217/95 |
| 663,009 | A * | 12/1900 | Cannon | 217/95 |
| 708,233 | A * | 9/1902 | Jurs, Jr. | 217/95 |
| 721,539 | A * | 2/1903 | Bruinekool | 217/95 |
| 751,370 | A * | 2/1904 | Beckman | 217/95 |
| 1,187,430 | A * | 6/1916 | Kenly | F16L 33/04 24/275 |
| 1,487,682 | A * | 3/1924 | Leppert | H01R 4/301 411/999 |
| 2,205,135 | A * | 6/1940 | Eggerss | 24/279 |
| 2,486,565 | A * | 11/1949 | Kojan et al. | 292/256 |
| 2,546,923 | A * | 3/1951 | Dunneback | 206/319 |
| 2,688,170 | A * | 9/1954 | Balzer | 24/68 BT |
| 2,697,570 | A | 12/1954 | Snyder | |
| 2,929,474 | A * | 3/1960 | Boardman | F16B 41/002 403/21 |
| 3,426,321 | A * | 2/1969 | Peterson, Jr. | H01R 4/34 178/23 R |
| 3,861,723 | A * | 1/1975 | Kunz et al. | 285/410 |
| 4,722,561 | A * | 2/1988 | Heckethorn et al. | 285/411 |
| 4,790,702 | A * | 12/1988 | Maganias | F16B 35/041 29/525.02 |
| 4,877,364 | A * | 10/1989 | Sorrentino | F16B 5/0275 403/408.1 |
| 4,982,864 | A * | 1/1991 | Kusta | 220/320 |
| 5,301,986 | A * | 4/1994 | Yehezkeli | 285/367 |
| 5,720,086 | A * | 2/1998 | Eliasson et al. | 24/279 |
| 6,435,576 | B1 * | 8/2002 | Kusta | 292/256.67 |
| 6,481,762 | B1 * | 11/2002 | Rex et al. | 285/337 |
| 7,215,550 | B1 * | 5/2007 | Yang et al. | 361/704 |
| 7,597,367 | B2 * | 10/2009 | Berenfield et al. | 292/256.67 |
| 2008/0116698 | A1 | 5/2008 | Berenfield et al. | |

* cited by examiner

LOCKING-RING CLOSURE HAVING AT LEAST ONE SCREW LOCK

CROSS-REFERENCE TO RELATED APPLICATIONS

This application is the National Stage entry of PCT/EP2013/062417, filed on Jun. 14, 2013, which claims priority to European Application Number 12172060.1, filed on Jun. 14, 2012, and U.S. Ser. No. 61/659,502 filed on Jun. 14, 2012, which are incorporated herein by reference in their entireties.

TECHNICAL FIELD

The present invention relates to a locking-ring closure for fastening lids on containers, having at least one screw lock and comprising
an open locking ring having a U- or V-shaped cross section,
bearing blocks arranged at the ends of the locking ring, one of which bearing blocks has a through-passage hole and the other an internal thread,
a screw which extends through the through-passage hole in the one bearing block and engages by way of its thread in the internal thread of the other bearing block, wherein the screw extends beyond the width of this bearing block and, on the portion that emerges from the bearing block, carries a fixed threaded ring enclosing said portion.

BACKGROUND

In order to fasten lids on containers or drums, use is frequently made of locking rings, as a result of which a large number of screw connections are avoided.

Such locking rings usually have a U- or V-shaped cross section and ensure the fixing and sealing of the lid on a drum.

For handling, the open locking rings are provided with one or more turnbuckles which connect the free ends of the locking rings together and pull them together during closing and push them apart during opening. During opening, the locking ring can also assume a larger diameter on account of its internal stress.

A locking ring having a screw lock is known from German laid-open specification DE 197 28 655 A1. A locking ring of the type mentioned at the beginning is sold under the name "Locking ring DN 457" by the company UCON AG Containersysteme KG.

In order to easily and quickly open or close the locking-ring closure, use is frequently made of an electrically or pneumatically driven screwdriver, for example a cordless screwdriver. When the locking-ring closure is opened, the screwing operation should be interrupted before the threaded ring comes into contact with the bearing block. If this does not happen, the threaded ring arranged at the end of the screw frequently strikes the bearing block having the internal thread. In this case, the locking-ring closure receives an impulse, as a result of which it is catapulted up uncontrollably. As a result, there is a risk of injury to bystanders or material damage.

Accordingly, it is desired to avoid this disadvantage of the prior art and to specify a locking-ring closure in which there is no risk that it is catapulted at the end of the opening process when opening is carried out with the aid of a motor-driven screwdriver.

SUMMARY

A first aspect of the invention is directed to a locking ring closure for fastening lids on containers. In a first embodiment, a locking-ring closure for fastening lids on containers, having at least one screw lock and comprises: an open locking ring having a U- or V-shaped cross section, bearing blocks arranged at the ends of the locking ring, one of which bearing blocks has a through-passage hole and the other an internal thread, and a screw which extends through the through-passage hole in the one bearing block and engages by way of its thread in the internal thread of the other bearing block, wherein the screw extends beyond the width of this bearing block and, on the portion that emerges from the bearing block, carries a fixed threaded ring enclosing said portion, wherein the screw (2) has, at its end opposite the screw head (6), a portion (8) adjacent to the threaded ring and arranged on that side of the threaded ring (5) that faces the screw head, which portion (8) carries no thread engaging in the internal thread of the bearing block (4) and extends at least over the width of the bearing block.

In a second embodiment, the locking-ring closure of the first embodiment is modified wherein the threaded ring (5) is fixed to the shank of the screw (2) by a threaded pin (7).

In a third embodiment, the locking-ring closure of the first and second embodiments is modified, wherein the head (6) of the screw (2) is in the form of an external or internal polygonal, of a slot head, of a cross slot head, or of a hexalobular socket head.

In a fourth embodiment, the locking-ring closure of the third embodiment is modified, wherein the head (6) of the screw (2) is in the form of an external or internal hexagon.

In a fifth embodiment, the locking-ring closure of the first through fourth embodiments is modified, wherein the locking-ring closure consists of metal.

In a sixth embodiment, the locking-ring closure the first through fifth embodiments is modified, further comprising a plurality of screw locks distributed around its circumference.

DETAILED DESCRIPTION

Surprisingly, it has been found that the disadvantages of the prior art can be avoided by providing in the end position of the opening process, the screw has, in the region of the bearing block provided with an internal thread, no thread that engages in the internal thread. In this region, the screw can be in the form of a smooth shank and can also be profiled in some manner; all that is important is that, in the completely opened position of the locking-ring closure, it is not possible for the screw to engage in the internal thread in the bearing block.

Provided, therefore, is a locking-ring closure of the type mentioned at the beginning, in which the screw has, at its end opposite the screw head, a portion adjacent to the threaded ring and arranged on that side of the threaded ring that faces the screw head, which portion carries no thread engaging in the internal thread of the bearing block and extends at least over the width of the bearing block.

The threaded ring is fixed to the shank of the screw close to the end of the latter. This fixing can be achieved for example by adhesive bonding or welding. It is particularly advantageous with regard to easy removal that the threaded ring is fixed to the shank of the screw by a threaded pin.

The design of the screw head is not critical for the function of the present invention. It may be conventional screw heads which can be turned by means of a screwdriver.

Therefore, the head of the screw can be in the form of an external or internal polygonal, of a slot head, of a cross slot head or of a hexalobular socket head. Hexalobular socket head screws are also known as Torx® screws.

Advantageously, the head of the screw is in the form of an external or internal hexagon.

The locking-ring closure or parts thereof can consist of different materials including plastics. However, advantageously, the closure consists of metal, since particular stability and durability are achieved as a result.

Usually, locking-ring closures have only one screw closure. In order to achieve particularly wide opening, the locking-ring closure can have a plurality of screw locks distributed around its circumference, for example two or three screw locks.

An exemplary embodiment of the invention is explained in more detail in the following text on the basis of the drawing, in which.

Figure 1:
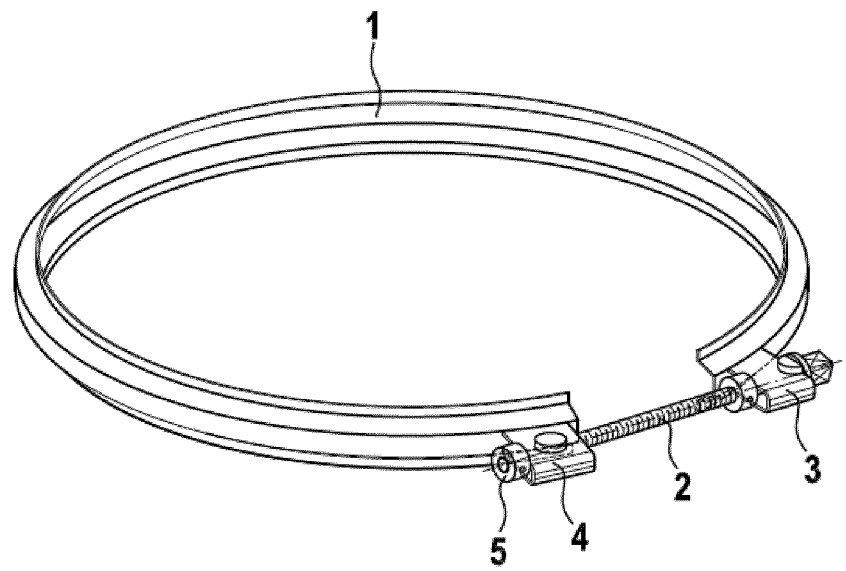
FIG. 1 shows a perspective illustration of the locking-ring closure.
Figure 2:
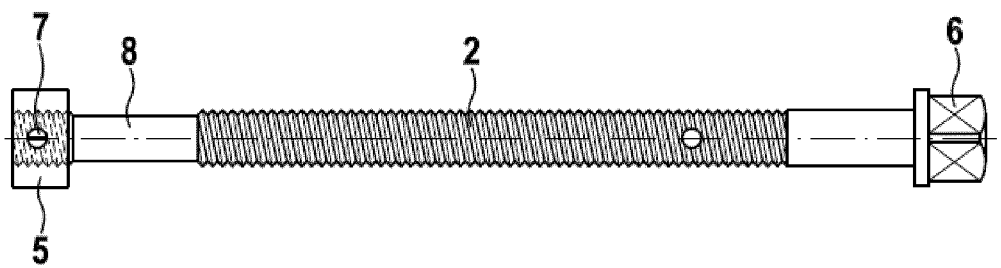
FIG. 2 shows a detail view of the screw.

The locking-ring closure has a locking ring (1) having a U-shaped cross section. Arranged at the end of the open locking ring are bearing blocks (3) and (4). The bearing block (3) has a through-passage hole and the bearing block (4) has an internal thread. A screw (2) extends through the through-passage hole in the bearing block (3) and engages in the internal thread of the bearing block (4). The end of the screw (2) projects out of the bearing block (4). A threaded ring (5) is fixed to this part of the screw shank by means of a threaded pin (7). Adjacent to the threaded ring (5), the shank of the screw (2) has a portion (8) which carries no thread.

On account of the thread-free portion (8), the locking-ring closure can be opened in a risk-free manner with the aid of a motor-driven screwdriver. Even if the threaded ring (5) strikes the bearing block (4) during opening, the screw-ring closure does not receive an impulse on account of the lack of engagement of the smooth screw shank in the internal thread of the bearing block. Therefore, it is not catapulted upwards and there is no risk of injury or material damage.

What is claimed is:

1. A locking-ring closure for fastening lids on containers comprising:
   an open locking ring having a U- or V-shaped cross section,
   bearing blocks arranged at the ends of the locking ring, one of which bearing blocks has a through-passage hole and the other an internal thread, and
   a screw which extends through the through-passage hole in the one bearing block and engages by way of its thread in the internal thread of the other bearing block, wherein the screw extends beyond the width of this bearing block and, on the portion that emerges from the bearing block, carries a fixed threaded ring enclosing said portion,
   wherein
   the screw has, at its end opposite a screw head, a portion adjacent to the threaded ring and arranged on that side of the threaded ring that faces the screw head, which portion carries no thread engaging in the internal thread of the bearing block and extends at least over the width of the bearing block.

2. The locking-ring closure of claim 1, wherein the threaded ring is fixed to the shank of the screw by a threaded pin.

3. The locking-ring closure of claim 1, wherein the screw head is in the form of an external or internal polygonal, of a slot head, of a cross slot head, or of a hexalobular socket head.

4. The locking-ring closure of claim 3, wherein the screw head is in the form of an external or internal hexagon.

5. The locking-ring closure of claim 1, wherein the locking-ring closure consists of metal.

* * * * *